US012729060B2

(12) United States Patent
Austrheim et al.

(10) Patent No.: US 12,729,060 B2
(45) Date of Patent: Sep. 8, 2026

(54) EXPANSION JOINT FOR CONNECTING A FIRST REGION AND A SECOND REGION OF A RAIL SYSTEM

(71) Applicant: Autostore Technology AS, Nedre Vats (NO)

(72) Inventors: Trond Austrheim, Etne (NO); Børge Bekken, Haugesund (NO); Martin Fitje, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 455 days.

(21) Appl. No.: 18/561,493

(22) PCT Filed: May 19, 2022

(86) PCT No.: PCT/EP2022/063580
§ 371 (c)(1),
(2) Date: Nov. 16, 2023

(87) PCT Pub. No.: WO2022/248333
PCT Pub. Date: Dec. 1, 2022

(65) Prior Publication Data

US 2024/0246763 A1 Jul. 25, 2024

(30) Foreign Application Priority Data

May 27, 2021 (NO) .................................... 20210674

(51) Int. Cl.
*B65G 1/04* (2006.01)
*B66C 7/10* (2006.01)
(Continued)

(52) U.S. Cl.
CPC .............. *B65G 1/0464* (2013.01); *B66C 7/10* (2013.01); *E01B 11/24* (2013.01); *B65G 1/0478* (2013.01);
(Continued)

(58) Field of Classification Search
CPC .......... E01B 11/00; E01B 11/02; E01B 11/56; E01B 11/24; B66C 7/10; B65G 1/0478; B65G 1/0464
See application file for complete search history.

(56) References Cited

U.S. PATENT DOCUMENTS 1,401,139 A * 12/1921 Clancy .................... E01B 11/24 238/231
1,707,437 A * 4/1929 Keough .................. E01B 11/02 238/244
(Continued)

FOREIGN PATENT DOCUMENTS

CN 1487144 A 4/2004
CN 203715082 U 7/2014
(Continued)

OTHER PUBLICATIONS

International Search Report issued in PCT/EP2022/063580 on Sep. 22, 2022 (5 pages).
(Continued)

*Primary Examiner* — S. Joseph Morano
*Assistant Examiner* — Maxwell L Meshaka
(74) *Attorney, Agent, or Firm* — Baker Botts L.L.P.

(57) ABSTRACT

A storage system includes a first region and a second region of a rail system. Each of the first region and the second region has rails with a profiled upper surface that define one or more tracks for supporting container handling vehicles, and each rail of at least one pair of parallel rails of the first region is connected to a corresponding rail of a pair of rails of the second region via an expansion joint. The expansion joint includes a first rail element, a second rail element, and a profiled upper surface. The rail elements are elongate and configured at a first end to allow the first ends of the first and second rail elements to move relative to one another in a longitudinal direction in a junction area where they overlap.
(Continued)

The profiled upper surface defines one or more tracks. The tracks extend from the first rail element through the junction area to the second rail element. A second end of the first rail element is pivotably connected to the first region of the rail system around a first vertical axis. A second end of the second rail element is pivotably connected to the second region of the rail system around a second vertical axis.

16 Claims, 17 Drawing Sheets

(51) Int. Cl.
*E01B 11/24* (2006.01)
*B65G 1/06* (2006.01)

(52) U.S. Cl.
CPC ...... *B65G 1/065* (2013.01); *B65G 2201/0235* (2013.01)

(56) References Cited

U.S. PATENT DOCUMENTS 1,782,031 A * 11/1930 Douglas .................. E01B 11/24 238/237
1,803,009 A * 4/1931 Faries ..................... E01B 11/02 238/161.5
2,156,312 A * 5/1939 Schuppner ............. E01B 11/02 238/244
2,204,395 A * 6/1940 Balcar ..................... E01B 11/28 238/218
2,231,102 A * 2/1941 Zumpe .................... E01B 11/24 238/164
3,499,604 A * 3/1970 Nelson .................... E01B 11/24 238/230
3,528,608 A 9/1970 Dashew et al.
3,606,152 A * 9/1971 Orth ........................ E01B 11/56 238/151
8,302,879 B2 * 11/2012 Christ ..................... E01B 11/56 238/171
10,660,438 B2 * 5/2020 Hognaland ............ A47B 91/02
11,685,391 B2 * 6/2023 Austrheim ........... G05D 1/0011 414/807
11,807,452 B2 * 11/2023 Fjeldheim .............. B65G 60/00
11,981,505 B2 * 5/2024 Austrheim ........... B65G 1/1378
12,098,030 B2 * 9/2024 Austrheim ........... B65G 1/0464
12,161,899 B2 * 12/2024 Austrheim ............. A62C 3/002
12,162,680 B2 * 12/2024 Fjeldheim ................. B66F 9/24
12,214,960 B2 * 2/2025 Austrheim ........... B65G 1/0478
12,286,294 B2 * 4/2025 Austrheim ........... B65G 1/0464
12,377,885 B2 * 8/2025 Austrheim ............. B65G 63/06
12,378,070 B2 * 8/2025 Austrheim ........... B65G 1/1378
12,515,880 B2 * 1/2026 Hatteland ............ B65G 1/0485
2010/0193597 A1 * 8/2010 Christ ....................... E01B 7/02 238/171
2019/0009984 A1 * 1/2019 Hognaland .......... B65G 1/0485
2019/0142160 A1 * 5/2019 Hognaland ............ A47B 91/16 248/188.2
2019/0169801 A1 * 6/2019 Abreu ..................... E01B 11/26
2020/0290804 A1 * 9/2020 Fjeldheim ............ B65G 1/0464
2021/0229916 A1 * 7/2021 Austrheim ........... B65G 1/0492
2021/0285163 A1 9/2021 Preidt et al.
2021/0339950 A1 * 11/2021 Austrheim ........... B65G 1/0464
2022/0041375 A1 * 2/2022 Austrheim ........... B65G 1/1378
2022/0097967 A1 * 3/2022 Austrheim ........... B65G 1/0492
2022/0168601 A1 * 6/2022 Austrheim ............. A62C 3/002
2022/0194702 A1 * 6/2022 Austrheim ........... B65G 1/1378
2022/0194705 A1 * 6/2022 Hatteland ............ B65G 1/0485
2023/0331241 A1 * 10/2023 Austrheim ............. B65G 65/23
2024/0051748 A1 * 2/2024 Fjeldheim ................. B66F 9/24
2024/0166437 A1 * 5/2024 Austrheim .............. F25D 25/04
2024/0246763 A1 * 7/2024 Austrheim ................ B66C 7/10
2024/0253901 A1 * 8/2024 Austrheim ........... B65G 1/0464
2024/0253904 A1 * 8/2024 Austrheim ........... B65G 1/0492
2024/0294332 A1 * 9/2024 Austrheim ........... B65G 1/0471
2024/0343137 A1 * 10/2024 Austrheim ............. B60L 53/30
2024/0417171 A1 * 12/2024 Austrheim ........... B65G 1/1375
2025/0019165 A1 * 1/2025 Austrheim ........... B65G 1/0464
2025/0050145 A1 * 2/2025 Austrheim ............. A62C 3/002
2025/0115428 A1 * 4/2025 Austrheim ........... B65G 1/0464
2025/0136154 A1 * 5/2025 Austrheim ............. B65G 47/06
2025/0171231 A1 * 5/2025 Austrheim ............. B65G 1/065
2025/0171240 A1 * 5/2025 Austrheim ............. B65G 1/065
2025/0178835 A1 * 6/2025 Austrheim ........... B65G 1/0464
2025/0187826 A1 * 6/2025 Austrheim .............. B61C 13/04
2025/0187828 A1 * 6/2025 Austrheim ........... B65G 1/0464
2025/0197110 A1 * 6/2025 Austrheim ........... B65G 1/0464
2025/0197118 A1 * 6/2025 Austrheim .......... B66F 9/07586
2025/0289481 A1 * 9/2025 Austrheim ........... B65G 1/0485
2025/0313405 A1 * 10/2025 Austrheim ........... B65G 1/0464
2025/0353676 A1 * 11/2025 Austrheim ........... B65G 1/0464
2025/0360950 A1 * 11/2025 Austrheim ........... B65G 1/0464
2025/0376324 A1 * 12/2025 Austrheim ........... B65G 1/0464
2026/0070735 A1 * 3/2026 Austrheim ........... B65G 1/0464

FOREIGN PATENT DOCUMENTS

CN 109844223 A 6/2019
CN 112839884 A * 5/2021 ............... B65G 1/12
EP 3699112 A1 8/2020
JP S59-130901 A 7/1984
JP 2012-106814 A 6/2012
KR 102406321 B1 * 6/2022 .............. E01B 11/24
NO 317366 B1 10/2004
WO WO-2013058162 A1 * 4/2013 .............. E01B 11/56
WO 2014/075937 A1 5/2014
WO 2014/090684 A1 6/2014
WO WO-2014118437 A1 * 8/2014 ............... B66C 7/08
WO 2015/193278 A1 12/2015
WO 2018/146304 A1 8/2018
WO 2019/206487 A1 10/2019
WO 2020/015336 A1 1/2020
WO WO-2020074257 A1 * 4/2020 ........... B65G 1/0464

OTHER PUBLICATIONS

Written Opinion of the International Searching Authority issued in PCT/EP2022/063580 on Sep. 22, 2022 (9 pages).
Norwegian Search Report issued in No. 20210674 mailed on Dec. 27, 2021 (2 pages).
D. Warachetbancha, "Notification of amendment and completion" in Thailand patent application 2301007702 (equivalent to US Office action), pub. by Thai Patent Office, Department of Intellectual Property, Bangkok, Thailand, Apr. 30, 2025, 4 pages (with English machine translation, 4 pages).
Hoffert, Rudi, Office Action in EP22729652.2, mailed May 27, 2025, 6 pages, European Patent Office, Rijswijk, Netherlands.
Zheng, Ziqi, Examining action in Chinese patent application 202280037909.7, mailed Sep. 29, 2025, 22 pages, pub. by The State Intellectual Property Office of the People's Republic of China, Beijing, China.
Zheng, Ziqi, Office Action in CN202280037909.7, mailed Mar. 13, 2026, 21 pages, The State Intellectual Property Office of the People's Republic of China, Beijing, China.

* cited by examiner

Fig. 7 (Detail A)

EXPANSION JOINT FOR CONNECTING A FIRST REGION AND A SECOND REGION OF A RAIL SYSTEM

FIELD OF THE INVENTION

The present invention relates to an expansion joint for connecting a first set of rails and a second set of rails, such as rails in an automated storage system.

BACKGROUND AND PRIOR ART

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 (i.e. a rail grid) arranged across the top of framework structure 100, on which rail system 108 a plurality of container handling vehicles 201,301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301,401 comprises a vehicle body **201*a*,301*a*,401*a* and first and second sets of wheels 201*b*,201*c*, 301*b*,301*c*,401*b*,401*c* which enable the lateral movement of the container handling vehicles 201,301,401 in the X direction and in the Y direction, respectively. In FIGS. 2, 3 and 4 two wheels in each set are fully visible. The first set of wheels 201*b*,301*b*, 401*b* is arranged to engage with two adjacent rails of the first set 110 of rails, and the second set of wheels 201*c*,301*c*,401*c* is arranged to engage with two adjacent rails of the second set 111 of rails. At least one of the sets of wheels 201*b*, 201*c*,301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111** at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body **201*a* in FIG. 2**.

Conventionally, and also for the purpose of this application, Z=1 identifies the uppermost layer for storing storage containers below the rail system 108, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body **201*a* as shown in FIGS. 2 and 4** and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing.

These grooves and upwardly protruding elements are collectively known as tracks. Each rail may comprise one track, or each rail may comprise two parallel tracks.

WO2018/146304A1, the contents of which are incorporated herein by reference, illustrates a typical configuration of rail system 108 comprising rails and parallel tracks in both X and Y directions forming a rail grid.

In the framework structure 100, most of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

In situations where two rail systems 108 are to be connected or constructed simultaneously for later connection, only minimal tolerances with respect to misalignment between the rail systems are allowed. Significant misalignment can result in a vehicle becoming derailed.

Ambient temperatures or temperature differences within the building or area where the rail systems are arranged can also bring issues for the automated storage and retrieval system. The rails may expand and contract significantly, resulting in buckling or over tension in the rails, potentially giving rise to movement in the rails and ultimately risking that a container handling vehicle could derail. The problems of expansion and contraction will depend in part on the length of the rails. Thus, for rail systems of a significant length either in the X direction and/or in the Y direction, there is an increased risk of movement and with that buckling and/or excessive tension in the rail system. A rail joint suitable for minimizing such buckling and/or excessive tensioning is described in WO 2020/074257 A1.

However, the prior art rail joint does not alleviate all potential issues that may arise when connecting two rail systems, in particular rail systems featuring rails in two perpendicular horizontal directions. Expansion and/or contraction of the rails may also cause lateral movement of the two rail systems relative to each other. The lateral movement may cause a rail joint to be subjected to buckling and/or excessive tension. Buckling and/or excessive tension of the rail joint caused by lateral movement of the rail systems may cause derailment of a container handling vehicle moving between the two rail systems as well as excessive wear of the rail joint.

An object of the present invention is to provide an improved rail joint for connection of two rail systems which alleviates or minimizes issues of the prior art.

SUMMARY OF THE INVENTION

The present invention is defined by the attached claims and in the following:

In a first aspect, the present invention provides a storage system comprising a first region and a second region of a rail system, wherein each of the first region and the second region has rails with a profiled upper surface that define one or more tracks for supporting container handling vehicles, and each rail of at least one pair of parallel rails of the first region is connected to a corresponding rail of a pair of rails of the second region via an expansion joint, the expansion joint comprises:

- a first rail element and a second rail element, the rail elements being elongate and configured at a first end to allow the first ends of the first and second rail elements to move relative to one another in a longitudinal direction in a junction area where they overlap, and
- a profiled upper surface that defines one or more tracks, the tracks extending from the first rail element through the junction area to the second rail element, wherein a second end of the first rail element is pivotably connected to the first region of the rail system around a first vertical axis, and a second end of the second rail element is pivotably connected to the second region of the rail system around a second vertical axis.

The second ends of the rail element are pivotably connected such that the first and second region may move relative to one another in a lateral direction, i.e. may move relative to one another in a lateral direction without distorting or twisting the expansion joints.

The first rail element is pivotably connected to the first region, such that the first rail element may not move in the longitudinal direction relative to the first region.

The second rail element is pivotably connected to the second region, such that the second rail element may not move in the longitudinal direction relative to the second region.

The first and second rail element is pivotably connected to the first and second region such that the first and second rail element may pivot laterally relative to the longitudinal direction.

The longitudinal direction in which the first rail element and the second rail element may move relative to each other is the same as the longitudinal direction of the rails connected by the expansion joint.

Each rail of the at least one pair of parallel rails extend in the same direction as the corresponding rails to which it is connected.

The container handling vehicle that may be supported by the rails may comprise at least one set of wheels being guided by the tracks. The tracks of the expansion joint extend for a distance being sufficient for guiding the container handling vehicle from the first region to the second region.

In an embodiment of the storage system, the rail system may comprise rails extending in two perpendicular directions forming a rail grid, the rail system may be supported upon vertical column profiles defining multiple storage columns in which storage containers may be stacked on top of each other, each of the storage columns is defined by four of the vertical column profiles. The rail system may define access openings above each storage column.

In an embodiment of the storage system, the expansion joint has a length substantially equal to a length or width of an access opening or storage container.

In an embodiment of the storage system, the first end of the first rail element comprises a male portion and the first end of the second rail element comprises a cooperating female portion, the male and female portion configured to interengage in the junction area.

In an embodiment of the storage system, the movement of the first rail element in the longitudinal direction relative to the second rail element is guided by a support profile.

The support profile may be a longitudinal support profile. The support profile may be arranged to prevent lateral movement between the first and the second rail element, such that the first and second rail element will pivot in the same direction around the respective first and second vertical axis during a lateral movement of the expansion joint. The support profile may be configured to allow the first ends of the rail elements to slide within the support profile.

In an embodiment of the storage system, the support profile may comprise a first end configured to be pivotable around the first vertical axis and a second end configured to be pivotable around the second vertical axis.

In an embodiment of the storage system, at least one of the first end and the second end of the support profile may be slidably connected to the first region or the second region, respectively, such that at least one of the first region and the second region may move in the longitudinal direction relative to the support profile.

In an embodiment of the storage system, the support profile comprises vertical surfaces extending in the longitudinal direction, the vertical surfaces arranged to prevent lateral movement of the first rail element relative to the second rail element. The support profile may, preferably by the vertical surfaces, ensure that the first and second rail element will pivot in the same direction around the respective first and second vertical axis during a lateral movement between the first and second region.

In an embodiment of the storage system, the support profile may comprise an upper horizontal surface arranged to support the first rail element and the second rail element from below.

In an embodiment of the storage system, the support profile may have a U-shaped cross-section.

In an embodiment of the storage system, each of the first rail element and the second rail element is pivotably connected to the first region and the second region, respectively, by a bracket. The bracket may comprise a vertically extending connecting element, for rigid connection to the first or second region by fasteners, such as bolts, and a horizontally extending connecting element for pivotable connection to the second end of the first or second rail element.

In an embodiment of the storage system, the first rail element and the second rail element may be pivotably connected to the corresponding bracket by a fastener. The fasteners configured to fix the second ends of the rail element to the respective bracket while allowing pivot movement of the rail elements relative to the first and second region. The fastener may e.g. be a bolt or pin having a centerline being colinear with the first vertical axis or the second vertical axis.

In an embodiment of the storage system, at least one of the first end and the second end of the support profile is slidably connected to the corresponding bracket.

In an embodiment of the storage system, the support profile is supported by at least one of the brackets.

In an embodiment of the storage system, each of the first region and the second region has rails may extend in two perpendicular directions forming a rail grid upon which a container handling vehicle may move in two perpendicular directions.

In an embodiment of the storage system, each of the first ends of the rail elements may be arranged at a distance from the rails being connected, such that a gap is formed between the first end and an end of an opposing rail being connected. The gap allowing a pivot movement of the rail element relative to the rail being connected.

In an embodiment of the storage system, the bracket may comprise a profiled upper surface that defines one or more tracks forming an extension of the one or more tracks of the first rail element or the second rail element to which the bracket is connected.

In an embodiment of the storage system, each of the first ends of the rail elements may have a convex periphery and the bracket may comprise a corresponding concave periphery adjacent to the concave periphery, such that any of the first rail element and the second rail element may pivot relative to the respective bracket without forming a gap between the respective rail element and bracket.

In an embodiment of the storage system, each of the first rail element and the second rail element provides a portion of the or each track of the profiled upper surface so that there is a transition in the junction area extending along the expansion joint from the first rail element to the second rail element for the or each track.

In a second aspect, the present invention provides an expansion joint for connecting a first region and a second region of a rail system, the expansion joint comprising a first rail element, a second rail element and two brackets, wherein each of the first and second rail element is elongate and comprises a first end, a second end and a section of a profiled upper surface defining one or more tracks, the first ends of the first and second rail elements are configured to move relative to one another in a longitudinal direction in a junction area where they overlap, the sections of profiled upper surface extend from the first rail element through the junction area to the second rail element, and the second end of the first rail element is pivotably connected to one of the brackets around a first vertical axis and the second end of the second rail element is pivotably connected to the other bracket around a second vertical axis, each bracket being connectable to the first region or the second region.

In an embodiment, the expansion joint may comprise a support profile having a first end configured to be pivotable around the first vertical axis and a second end configured to be pivotable around the second vertical axis, at least one of the first end and the second end is slidably connected to one of the brackets.

In further embodiments, the expansion joint according to the second aspect may comprise any of the features disclosed for the expansion joint used in the storage system according to the first aspect.

In a third aspect, the present invention provides a method of allowing rail expansion/contraction between a first region and a second region of a rail system, wherein each of the first region and the second region has rails with a profiled upper surface that define one or more tracks for supporting container handling vehicles, the method comprising the steps of:

connecting each rail of at least one pair of parallel rails of the first region to a corresponding rail of a pair of rails of the second region via an expansion joint, wherein the expansion joint comprises a first rail element and a second rail element, the rail elements being elongate and configured at a first end to allow the first ends of the first and second rail elements to move relative to one another in a longitudinal direction in a junction area where they overlap, and a profiled upper surface that defines one or more tracks, the tracks extending from the first rail element through the junction area to the second rail element, and wherein a second end of the first rail element is pivotably connected to the first region of the rail system around a first vertical axis, and a second end of the second rail element is pivotably connected to the second region of the rail system around a second vertical axis.

In further embodiments, the method according to the third aspect may comprise any of the features disclosed for the expansion joint used in the storage system according to the first aspect.

The method may alternatively be termed a method of allowing transverse and longitudinal movement between a first region and a second region of a rail system.

BRIEF DESCRIPTION OF THE DRAWINGS

Embodiments of the invention are described in detail by reference to the following drawings:

FIGS. 21-22 are topside views of a third exemplary expansion joint according to the invention.

DETAILED DESCRIPTION OF THE INVENTION

In the following, embodiments of the invention will be discussed in more detail with reference to the appended drawings. The drawings are not intended to limit the invention to the illustrated subject-matter.

When interconnecting separate regions of a rail system featuring rails in two perpendicular horizontal directions, expansion and/or contraction of the rails due to e.g. temperature differences may cause lateral and longitudinal movement the regions relative to each other. These movements may cause a rail joint interconnecting the regions to be subjected to buckling, excessive tension and/or twisting.

Figure 1:
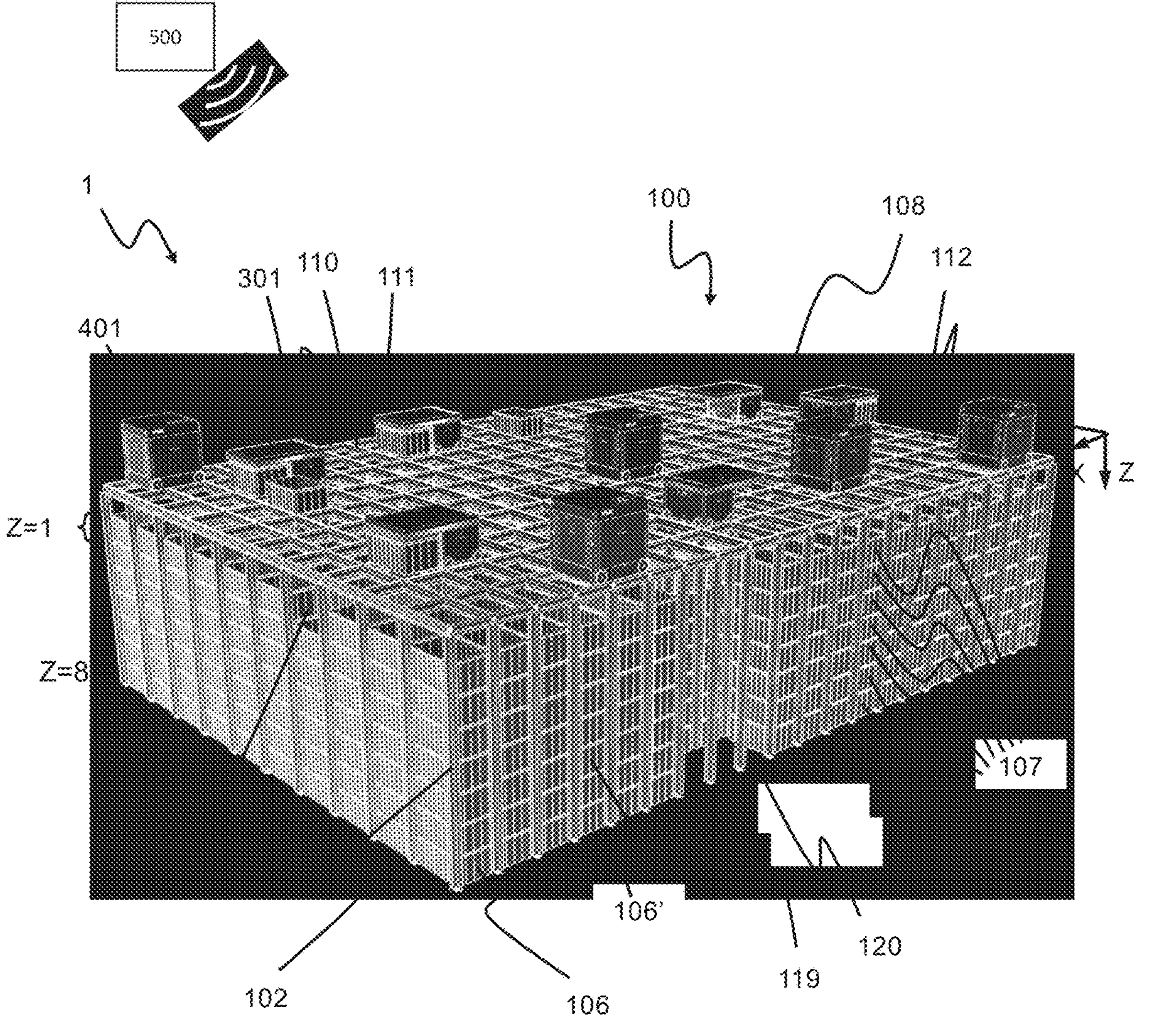
FIG. 1 is a perspective view of a framework structure of a prior art automated storage and retrieval system.
Figure 2:
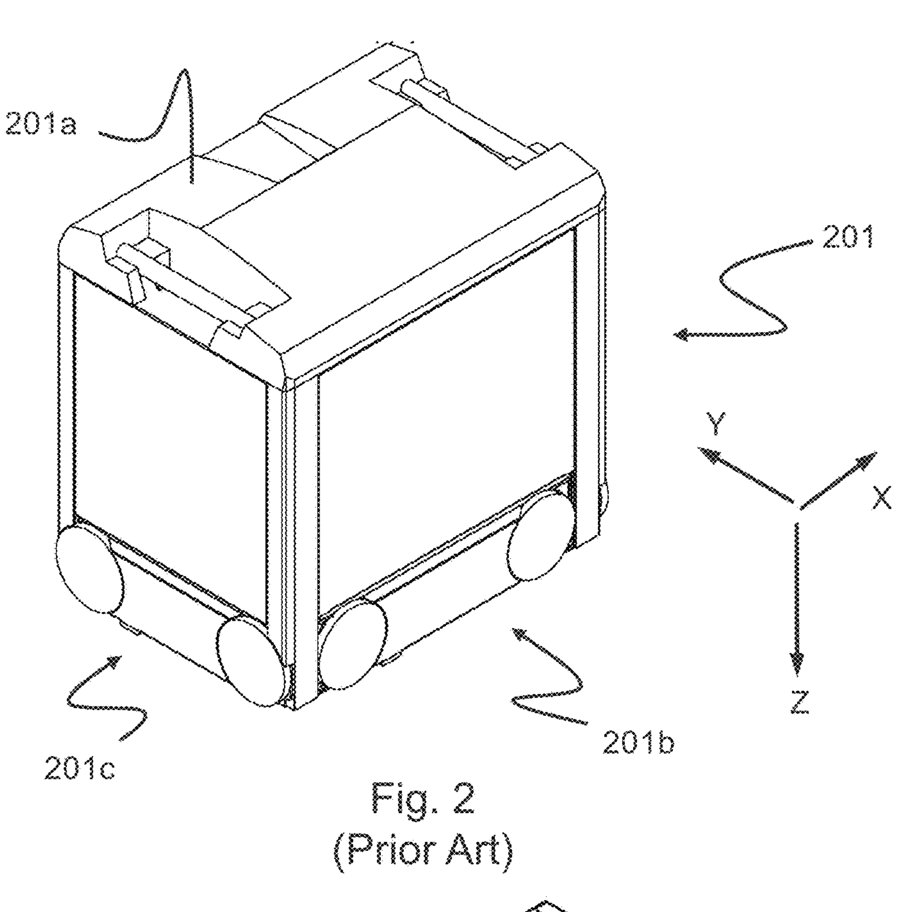
FIG. 2 is a perspective view of a prior art container handling vehicle having a centrally arranged cavity for carrying storage containers therein.
Figure 3:
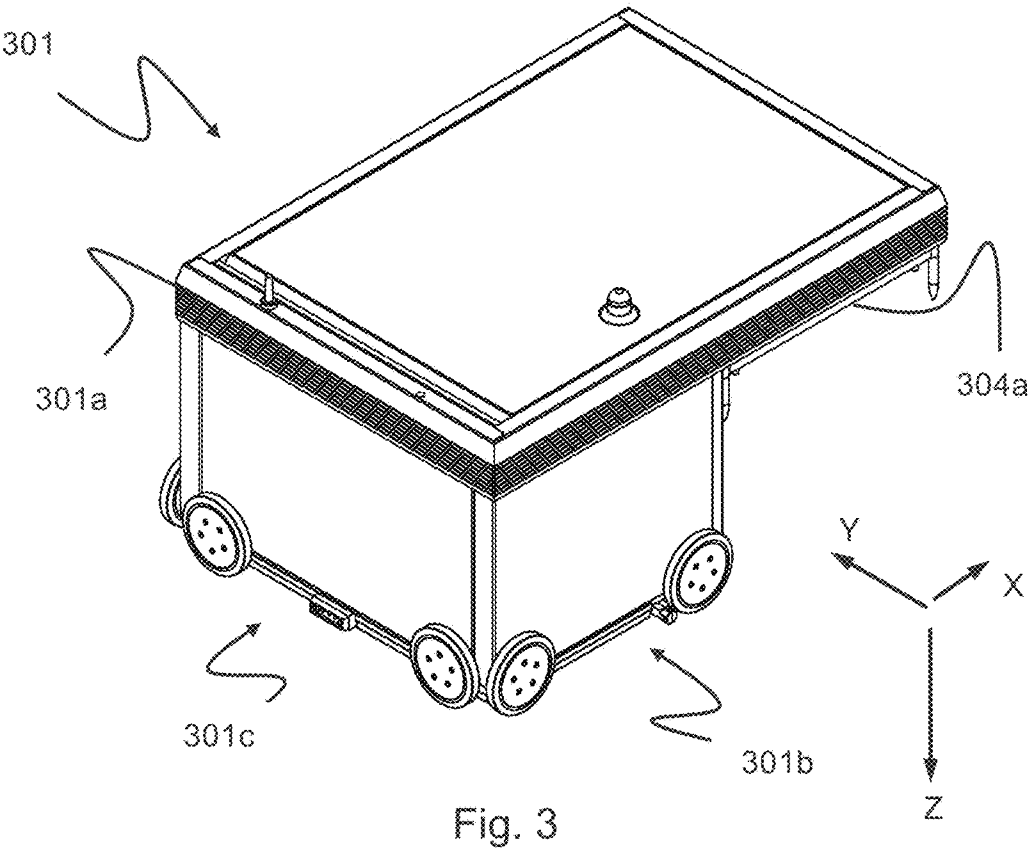
FIG. 3 is a perspective view of a prior art container handling vehicle having a cantilevered section for carrying storage containers underneath.
Figure 4:
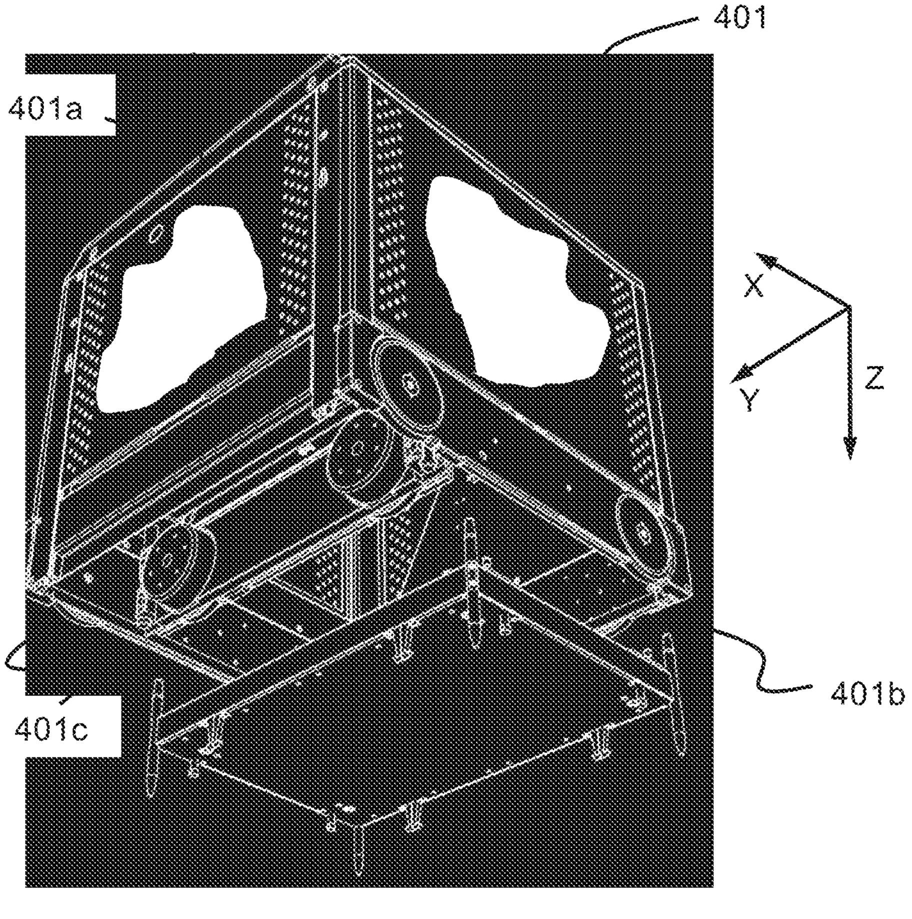
FIG. 4 is a perspective view from below of a prior art container handling vehicle, wherein the lifting device is shown.
Figure 5:
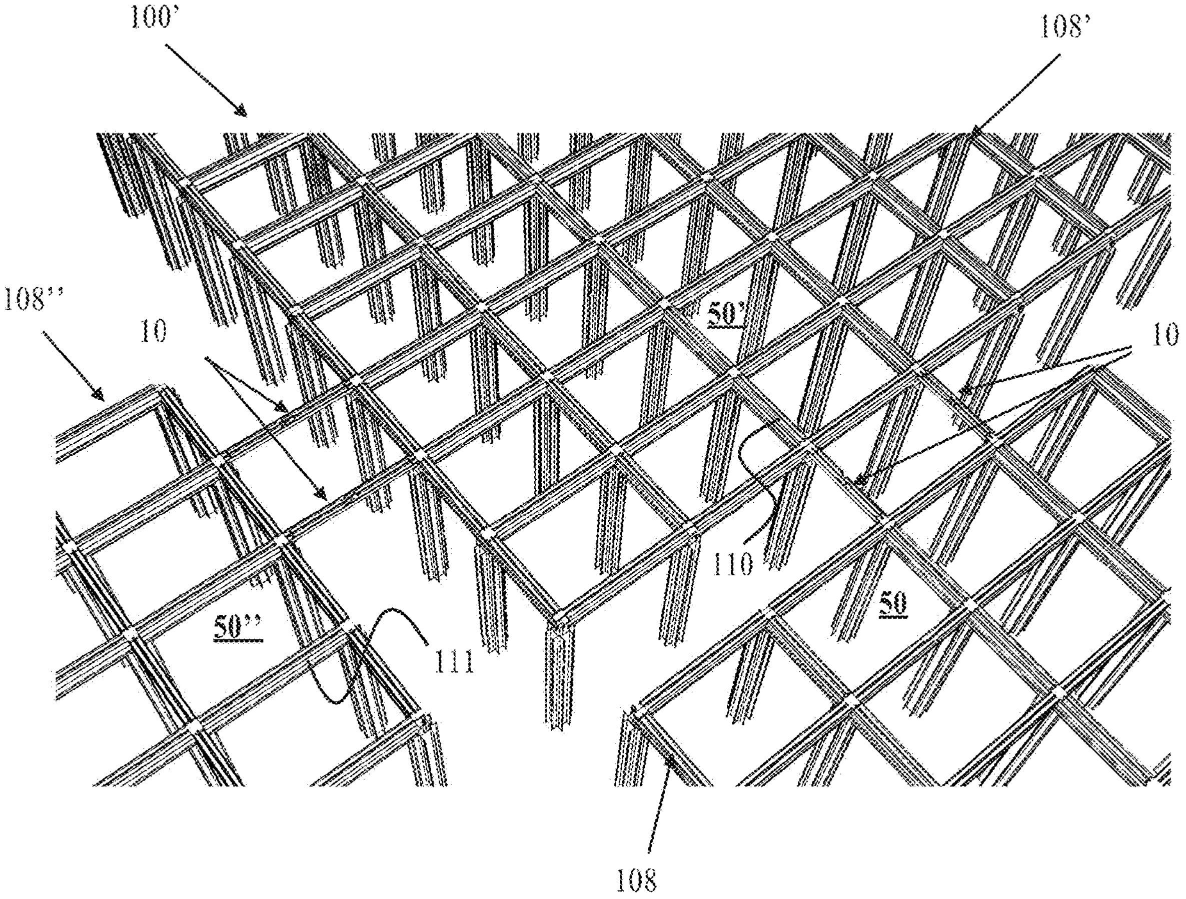
FIG. 5 is a topside perspective view of a first exemplary storage system according to the invention.
Figure 6:
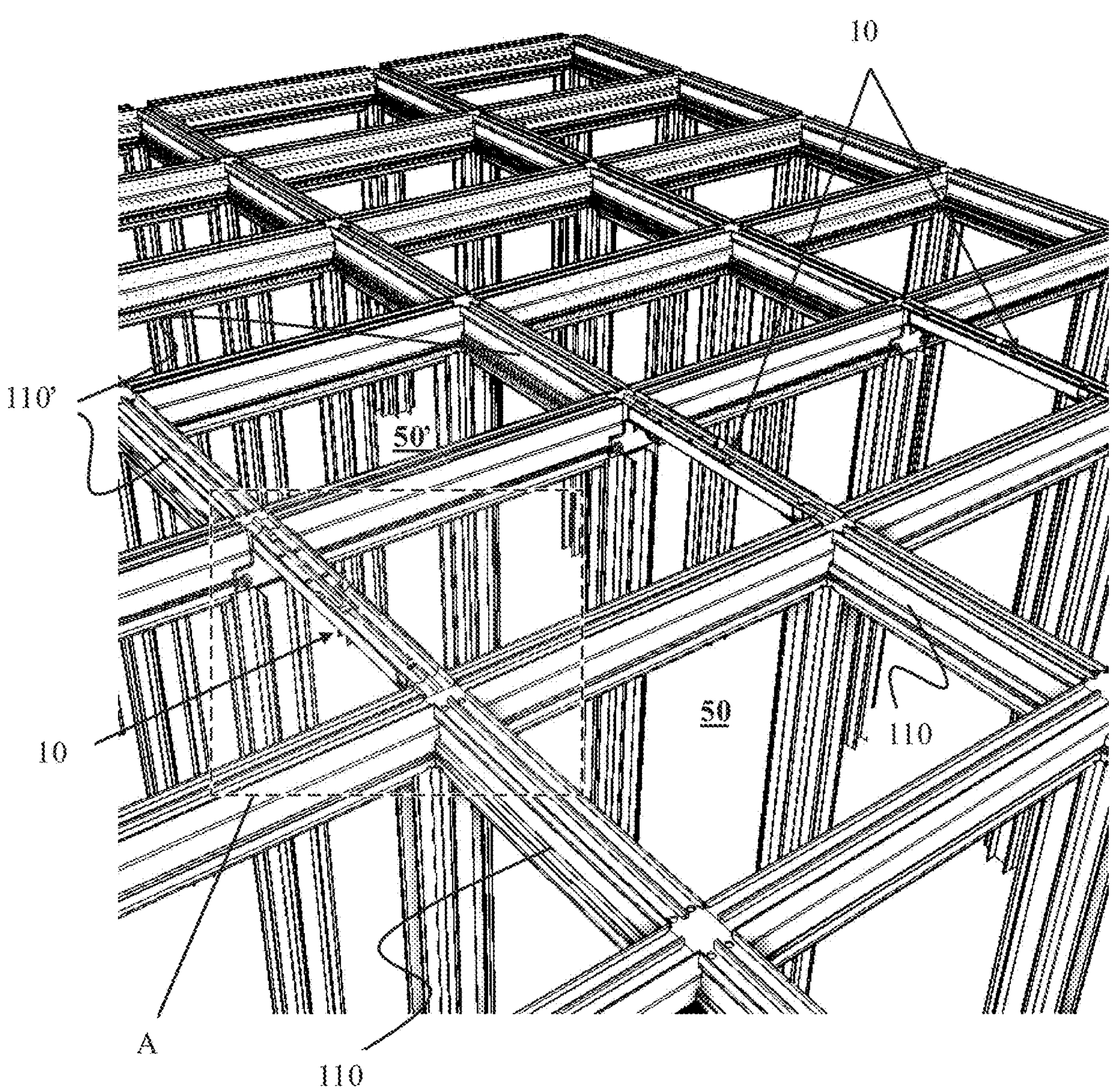
FIG. 6 is a topside perspective view of a second exemplary storage system according to the invention.
Figure 7:
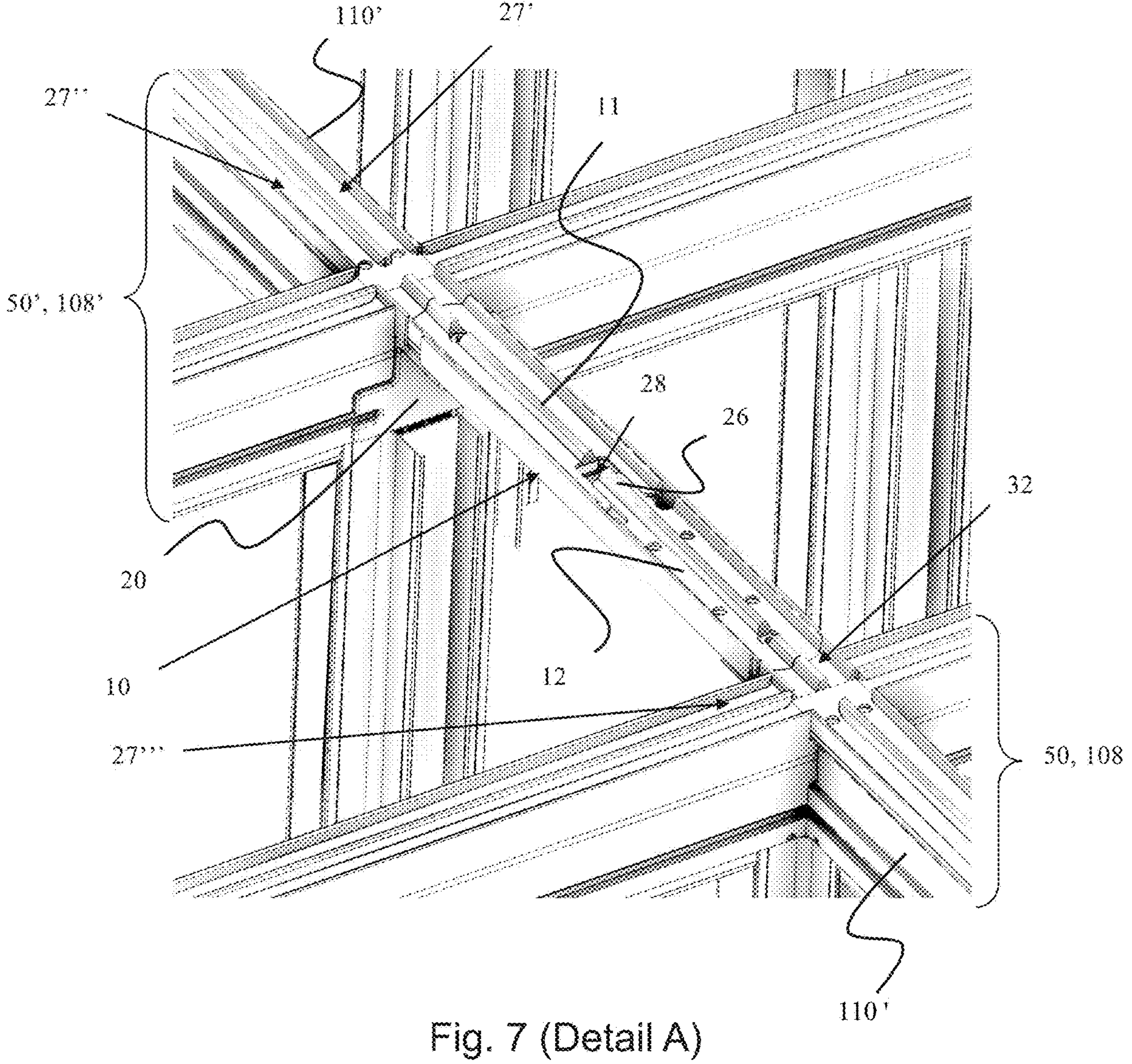
FIG. 7 is a detailed view of a section of the storage system in FIG. 6.
Figure 8:
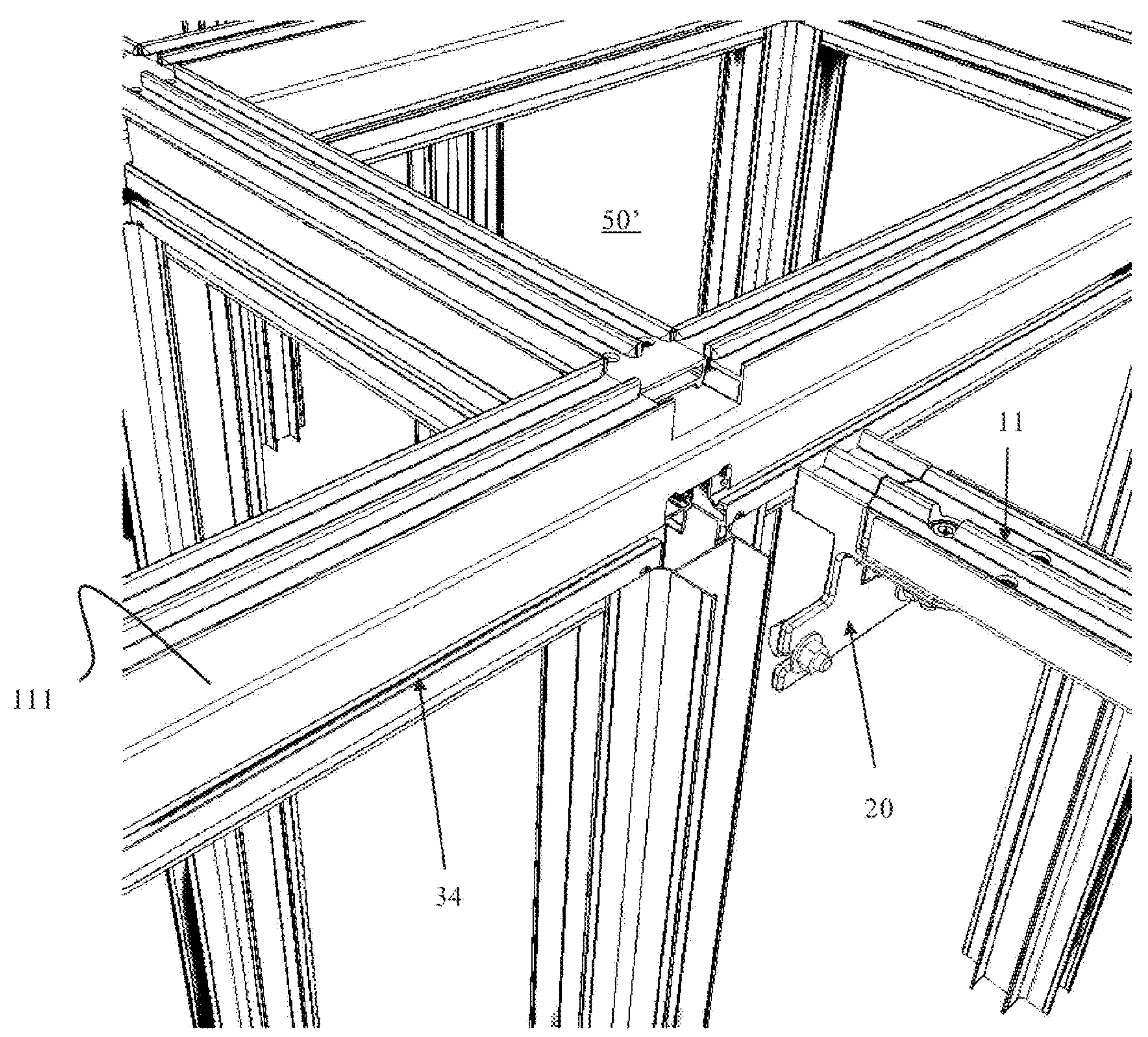
FIGS. 8-13 are views of a first exemplary expansion joint according to the invention.
Figure 9:
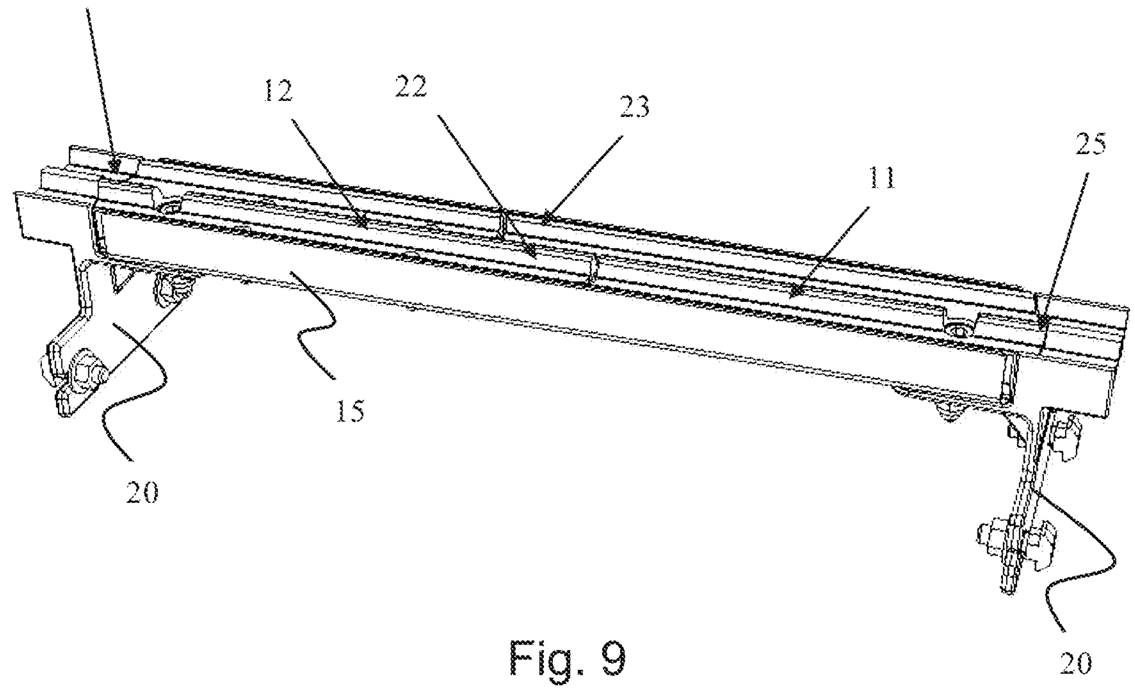

Exemplary embodiments of framework structures 100' for a storage system according to the invention is shown in FIGS. 5 and 6.

The framework structure 100' in FIG. 5 comprises a rail system 108,108',108" featuring three regions 50,50',50" interconnected by rail joint assemblies 10. The regions comprise rails 110,111 arranged in two perpendicular directions forming a rail grid upon which a container handling vehicle 201,301,401 may operate. The rail joint assemblies 10 can accommodate longitudinal and transverse movement between two connected regions 50,50',50", such that buckling, twisting and distortion of the rail joint assemblies 10 may be avoided.

The rail joint assemblies 10 are in the following being termed expansion joints 10.

The framework structure 100' in FIG. 6 comprises two regions 50,50', i.e. a first region 50 and a second region 50', interconnected by expansion joints 10. Each of the first region and the second region comprises rails 110,111 with a profiled upper surface that define one or more tracks 27', 27" for supporting container handling vehicles 201, 301, 401. Each rail 110 of at least one pair of parallel rails of the first region 50 is connected to a corresponding rail 110' of a pair of rails of the second region (50') via an expansion joint 10.

The expansion joint, see FIGS. 7-13, comprises a first rail element 12 and a second rail element 11. The rail elements 12, 11 are elongate and configured at a first end 22,23 to allow the first ends 22,23 of the first and second rail elements to move relative to one another in a longitudinal direction in a junction area 14 where they overlap. The longitudinal direction is the direction in which the rails 110 interconnected by the expansion joint extends. The junction area 14 is defined by a male portion 26 arranged at the first end 22 of the first rail element 12 and a cooperating female portion 28 arranged at the first end 23 of the second rail element 11.

Figure 11:
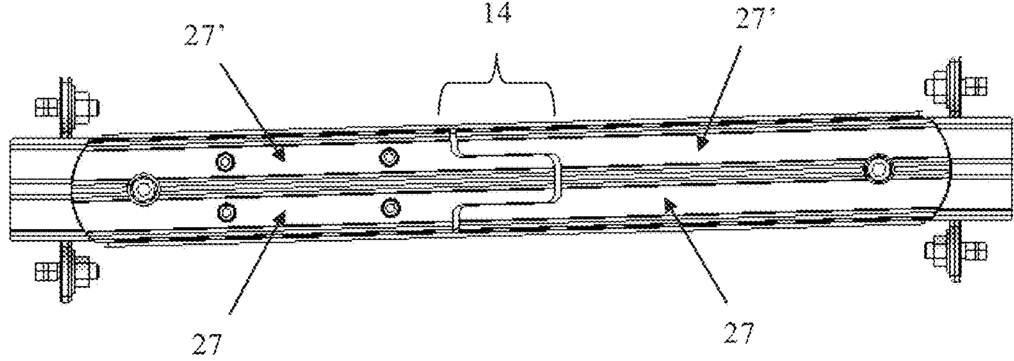
Figure 12:
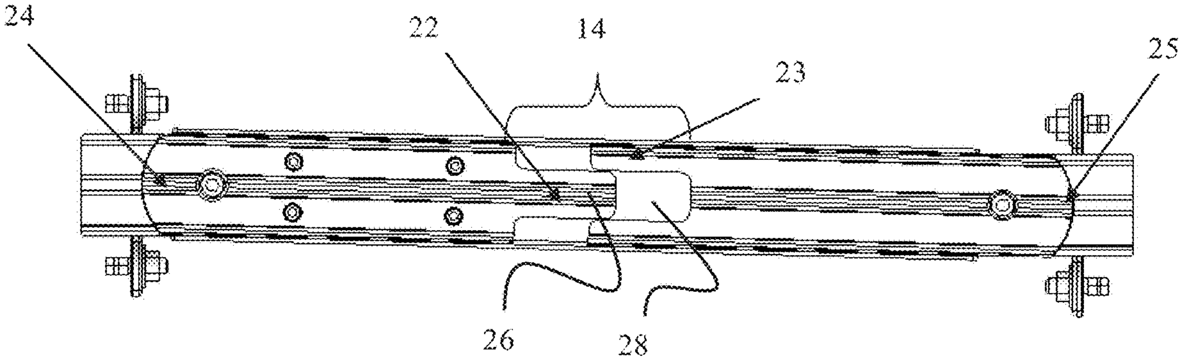
Figure 13:
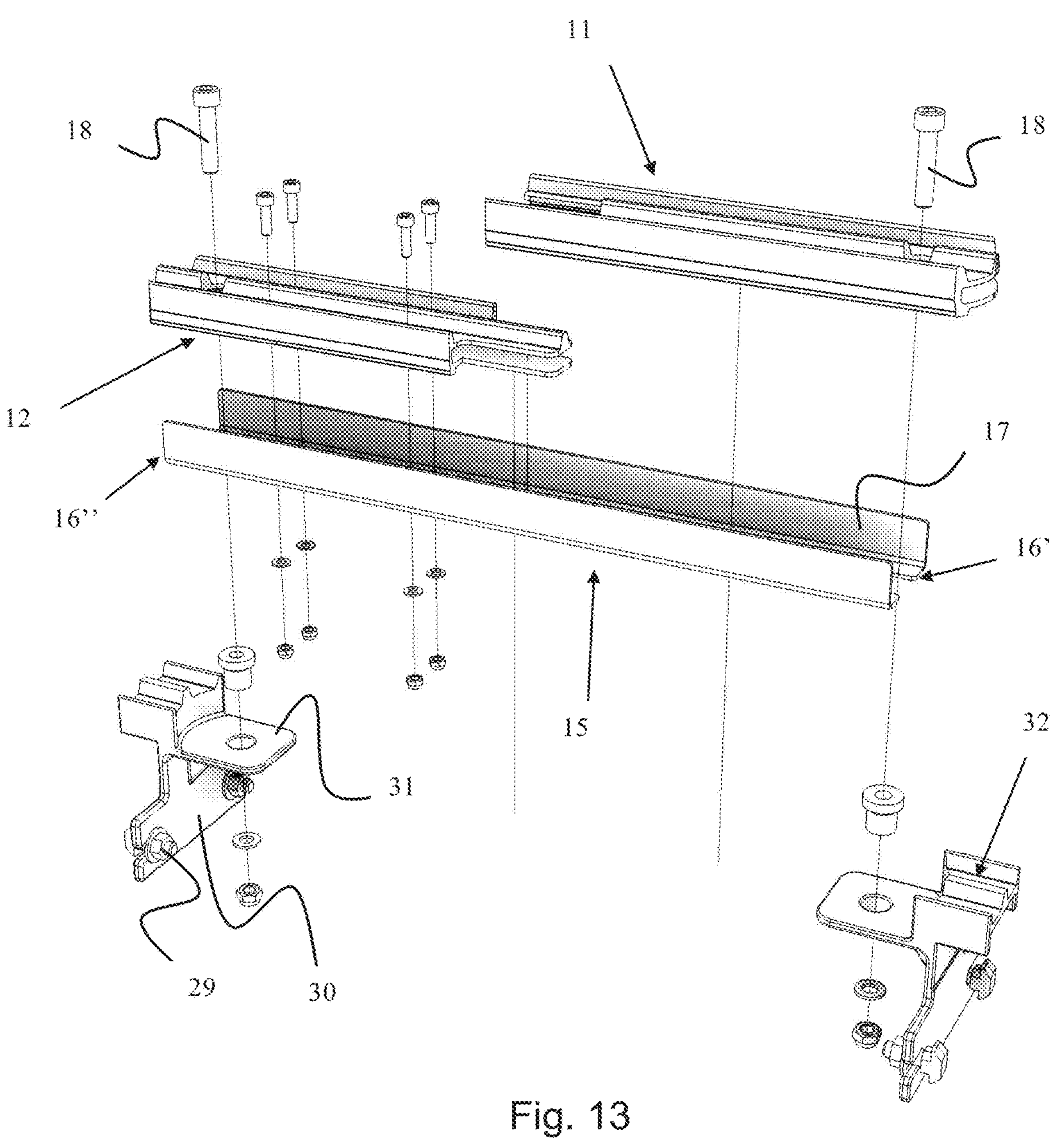

The expansion joint features a profiled upper surface that defines one or more tracks 27', 27", see FIG. 11, extending from the first rail element 12 through the junction area 14 to the second rail element 11. The tracks of the expansion joint are similar to the tracks of the rails 110,111.

The possibility for relative movement between the first rail element 12 and the second rail element 11 in the junction area 14 ensures that the expansion joint 10 will provide a continuous track 27,27' between the first region 50 and second region 50' even if the distance between the two regions is changed due to, for instance, temperature differences causing retraction/extension of the rails 110.

In addition to causing differences in the distance between the first region 50 and the second region 50', temperature differences may also cause lateral displacement between the two regions. Such lateral displacement may cause buckling/twisting of a joint interconnecting the two regions.

Figure 10:
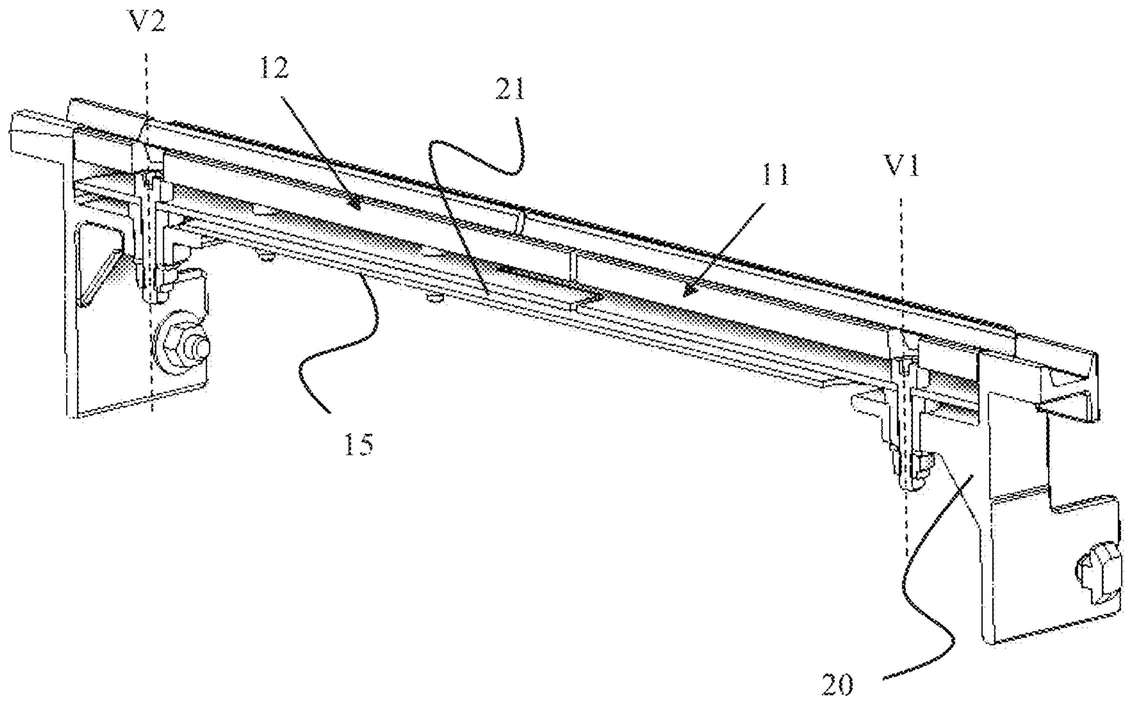

To avoid buckling/twisting of the expansion joint caused by lateral movement between the two interconnected regions, the first rail element 12 has a second end 24 pivotably connected to the first region 50 around a first vertical axis V1, and the second rail element has a second end 25 pivotably connected to the second region 50' around a second vertical axis V2, see FIG. 10.

Each of the first rail element 12 and the second rail element 11 is pivotably connected to the first region 50 and the second region 50', respectively, via a bracket 20 by use of bolts 18. The bracket 20 features a vertically extending connecting element 30, for rigid connection to the first or second region by fasteners 29 (e.g. bolts for connecting the bracket to a recess 34 of the first or second region), and a horizontally extending connecting element 31 for pivotable connection to the first or second rail element. The brackets 20 are arranged at a periphery of the rail system 108,108' of the region 50,50' to which it is connected, such that the first vertical axis V1 and the second vertical axis V2 is in a vertical plane outside the periphery. Each bracket 20 may be connected to the respective region 50,50' via a recess 34 in a sidewall of a rail 111 arranged at the periphery of the rail system 108,108'.

In the exemplary expansion joint in FIGS. 7-13, each of the second ends 24,25 of the rail elements has a convex periphery and the bracket 20 comprises a corresponding concave periphery adjacent to said concave periphery. This configuration allows any of the first rail element 12 and the second rail element 11 to pivot relative to the respective bracket 20 without forming a gap between the respective rail element 12,11 and bracket 20. In this particular embodiment, the pivot connection between the rail elements 12,11 and the bracket 20 also allows for an extensive pivot movement around the vertical axis V1,V2.

It is noted that the pivot connection of the rail elements 12,11 to the regions 50,50' does not have to allow for more than a small pivot movement, e.g. in a range of 0.5 to 3.0 degrees, to provide the required effect of avoiding buckling/twisting of the expansion joint caused by lateral movement between the two interconnected regions 50,50'.

The bracket 20 in FIGS. 7-13 comprises a profiled upper surface 32 that defines one or more tracks 27', 27" forming an extension of the one or more tracks 27', 27" of the first rail element 12 or the second element 11 to which the bracket 20 is connected. The profiled upper surface will block an unused track 27'" at the periphery of the first or second region. The profiled upper surface may provide an improved guidance of a container handling vehicle crossing over the expansion joint but is not required.

The movement of the first rail element 12 in the longitudinal direction relative to the second rail element 11 is guided by a support profile 15. The support profile 15 is supported by the brackets 20 and may be configured such that the first rail element 12 and the second rail element 11 may slide relative to each other within the support profile 15.

Figure 16:
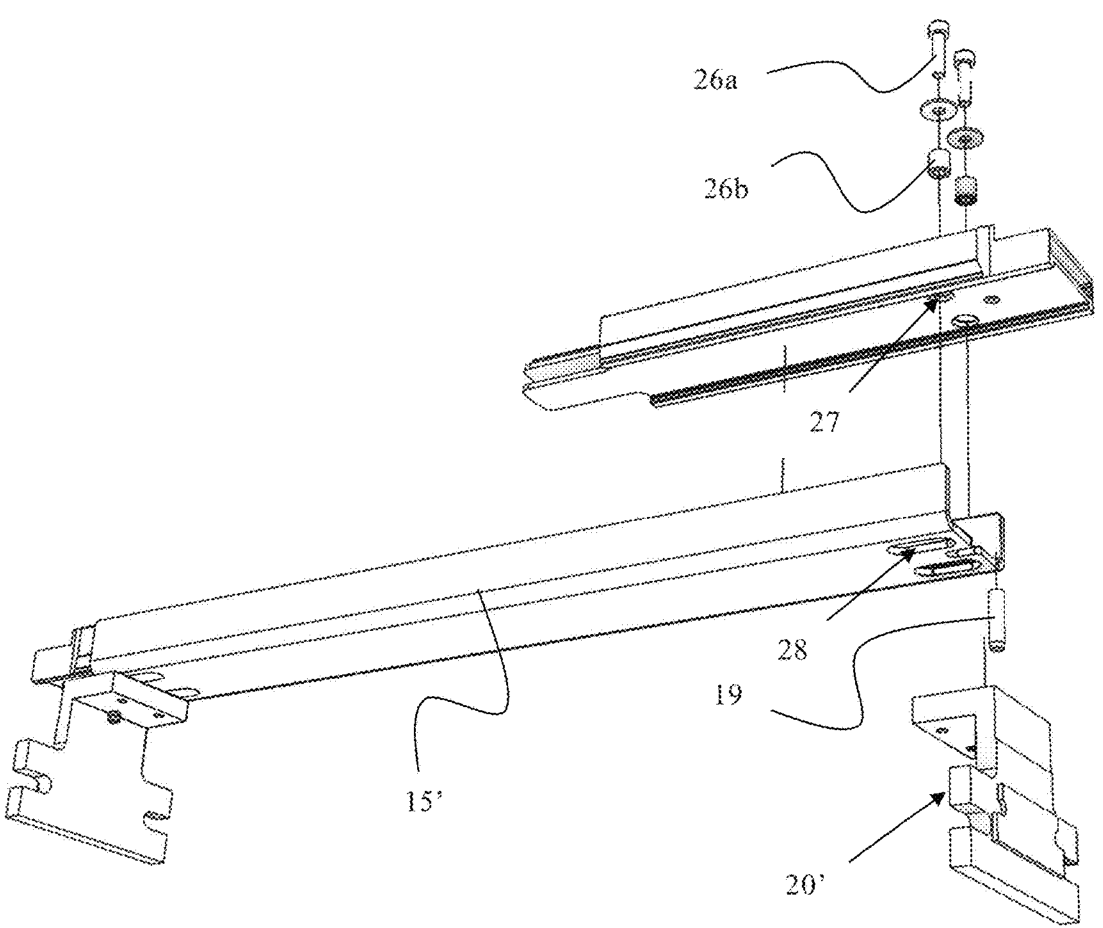
Figure 17:
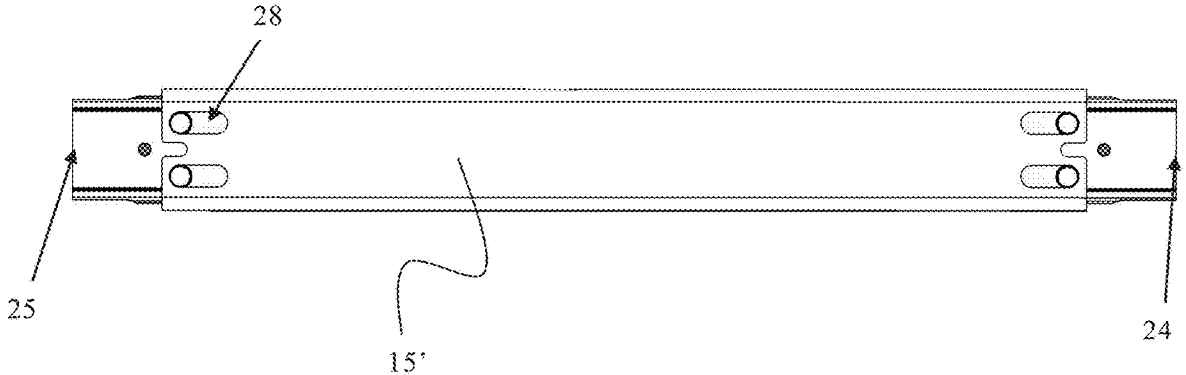
Figure 18:
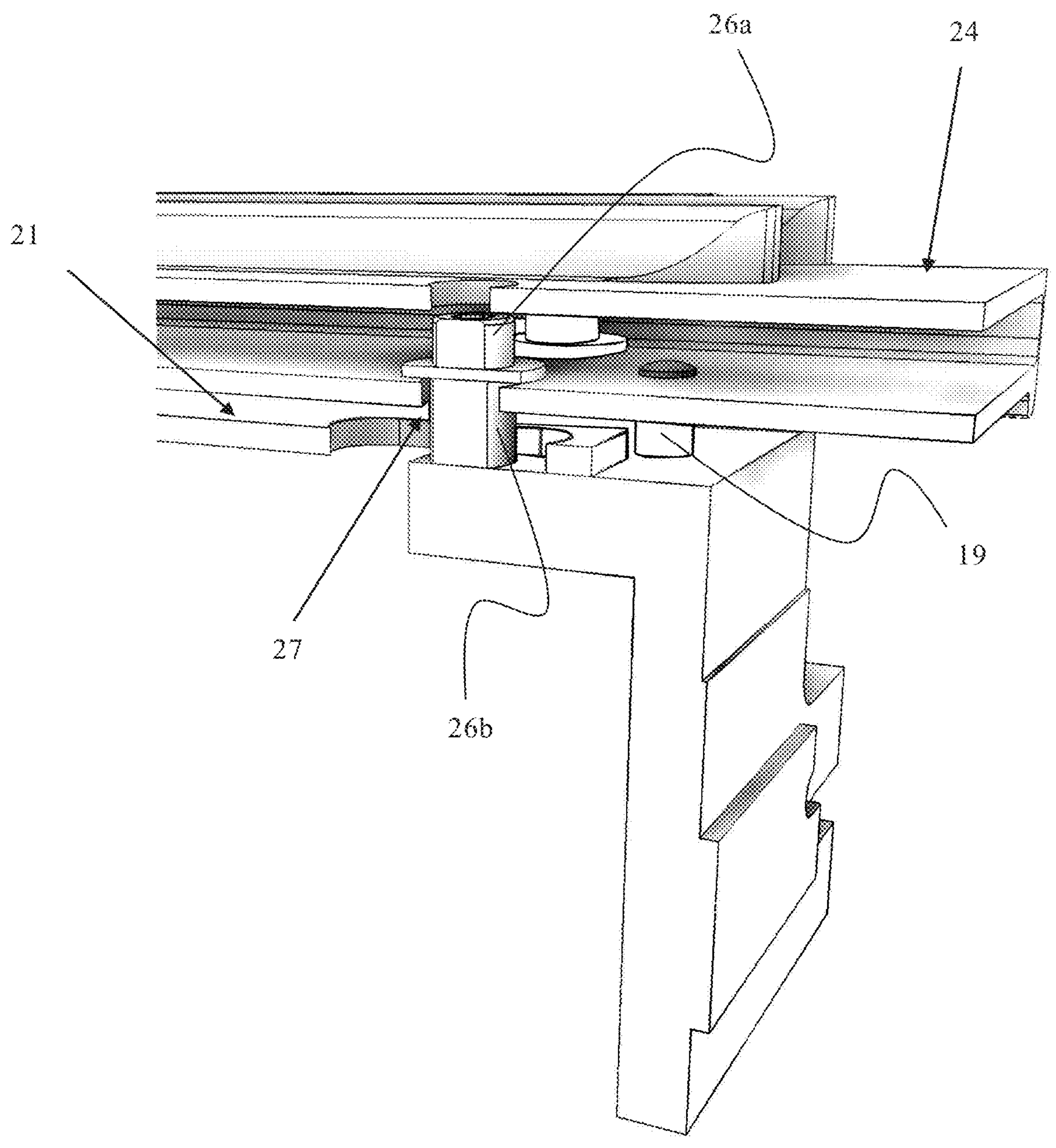
Figure 19:
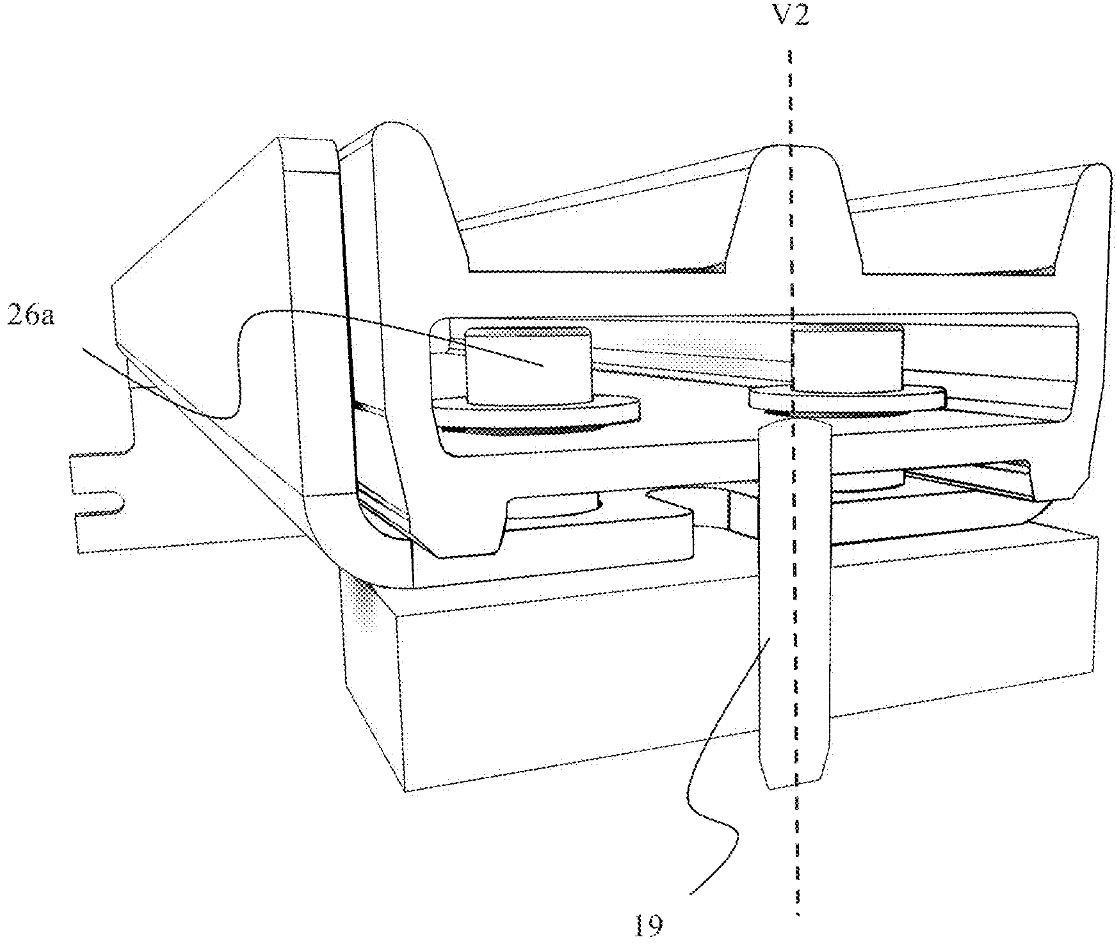
Figures 20, 21:
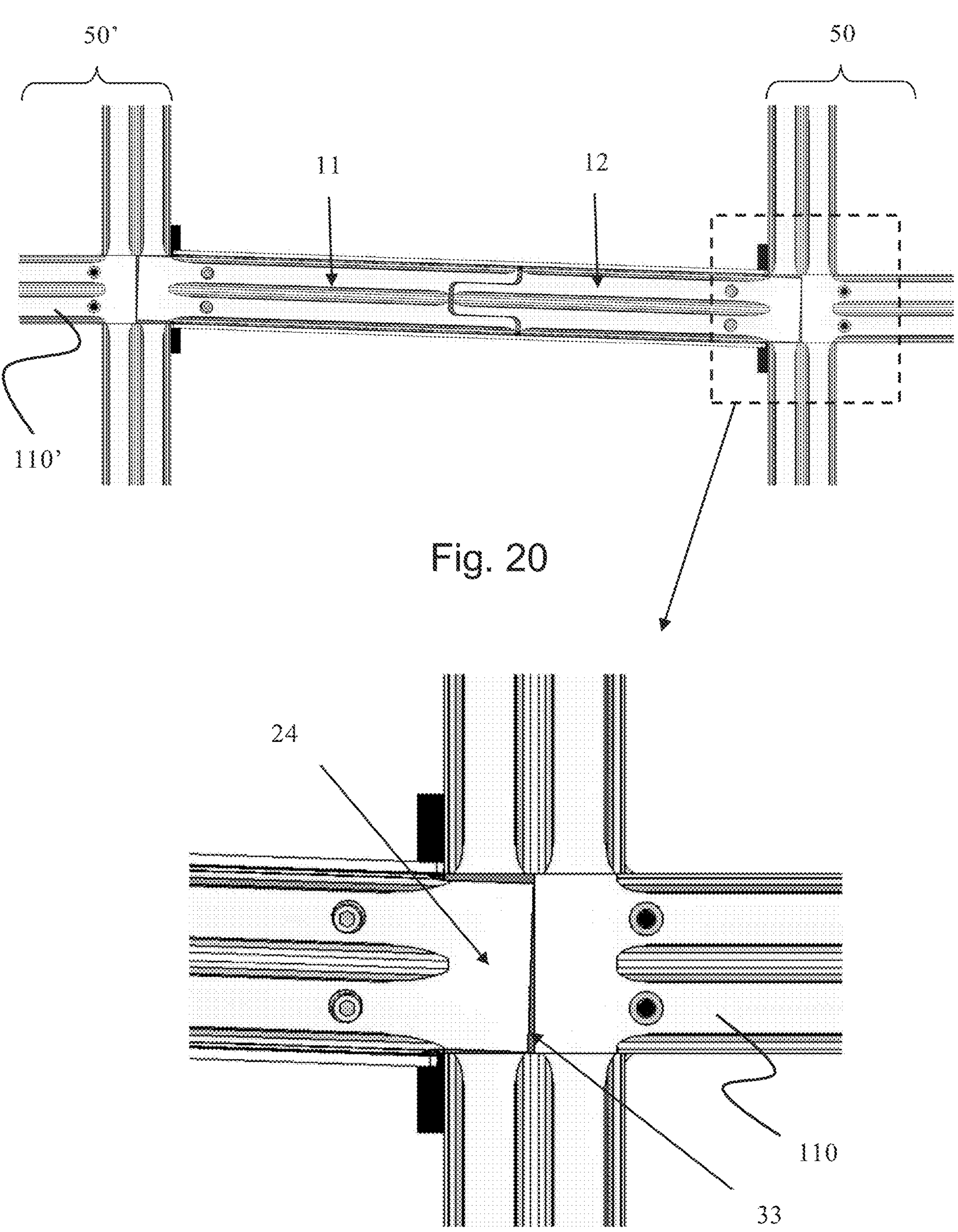

The support profile 15 has a first end 16' configured to be pivotable around the first vertical axis V1 and a second end 16" configured to be pivotable around the second vertical axis V2. In the illustrated embodiment, the first end 16' of the support profile 15 is slidably connected to the second region 50' via the bracket 20. In other exemplary embodiments, both ends 16',16" of the support profile 15 may be slidably connected to the respective regions, see e.g. FIGS. 15-17. The slidable connection of the support profile 15 to at least one of the regions 50,50' connected by the expansion joint is necessary to allow for the change in distance between the two regions 50,50'.

The support profile has a substantially U-shaped cross-section, and features vertical surfaces 17, extending in the longitudinal direction of the first and second rail element, and an upper horizontal surface 21. The vertical surfaces 17 are arranged to prevent lateral movement of the first rail element 12 relative to the second rail element 11. The upper horizontal surface 21 is arranged to support the first rail element 11 and the second rail element 12 from below. The support profile 15 ensures that the first and second rail element 12,11 will pivot in the same direction around the respective first and second vertical axis during a lateral movement between the two regions 50,50'.

Figure 14:
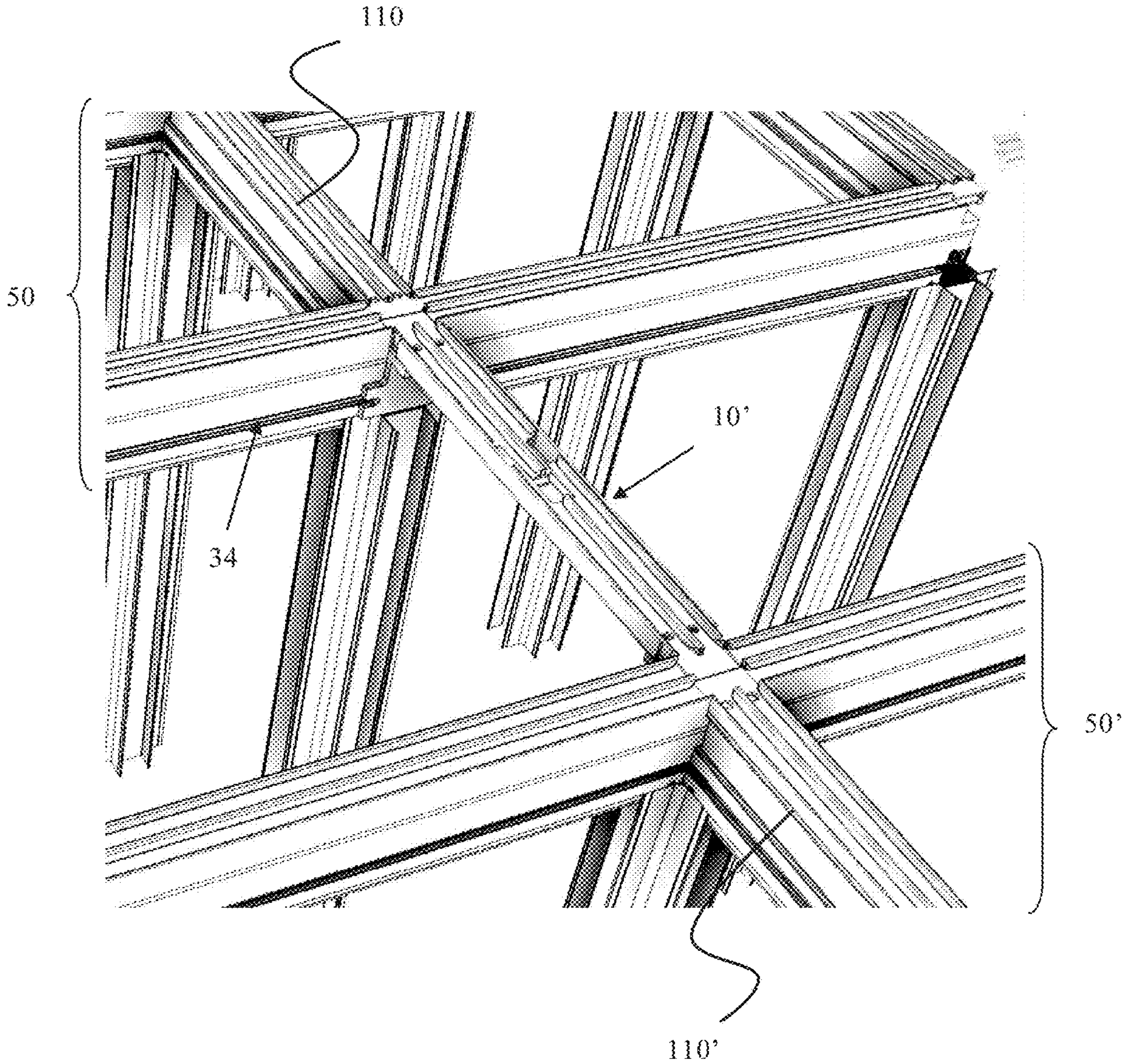
FIGS. 14-21 are views of a second exemplary expansion joint according to the invention.

A section of a storage system featuring a second exemplary embodiment of an expansion join 10' is illustrated in FIG. 14, and details of the expansion joint 10' is shown in FIGS. 15-21.

The function and effect of the expansion joint 10' are similar to the expansion joint in FIGS. 7-13.

The main differentiating feature of the second exemplary expansion joint 10', in view of the first exemplary expansion joint 10 is the manner in which the first rail element 12 and the second rail element 11 are pivotably connected to the two regions 50,50' of the rail system 108,108'. Further, the brackets 20' do not provide an upper profiled surface forming extensions between the rail elements 12,11 and the rails 110,110' interconnected by the expansion joint 10'. Instead, the rail elements 12,11 themselves are extended to provide the required upper surface.

Figure 15:
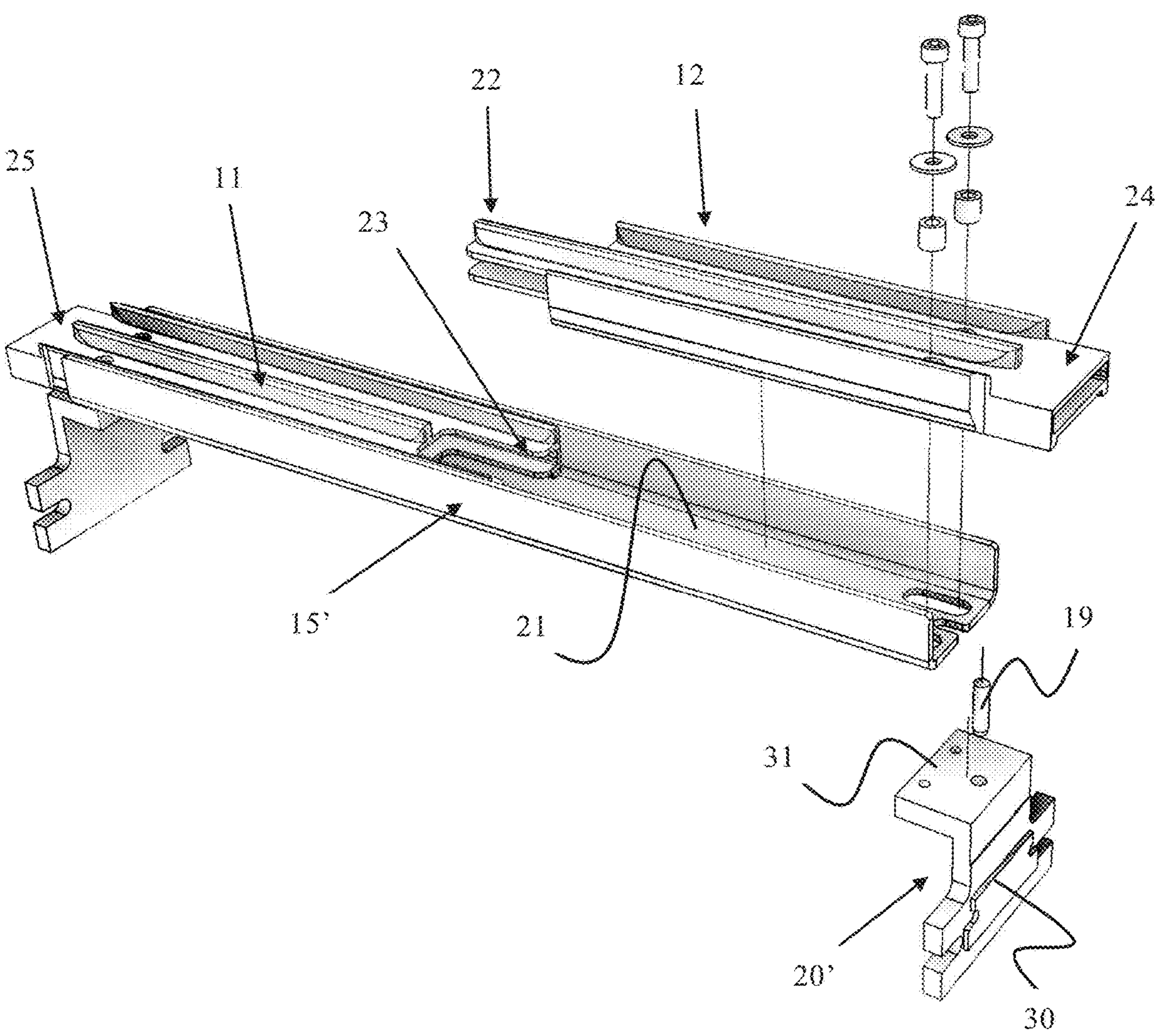

The first and second rail elements 12,11 are pivotably connected at the second ends 24,25 to a respective region 50,50' via pins 19 arranged on the bracket 20', see FIG. 15.

The first end 16' and the second end 16" of the support profile 15' comprises elongate through holes 28 and are slidably connected to the brackets 20' via bolts 26*a* and sleeves 26*b*. In addition, the bolts 26*a* fasten the rail elements 12,11 to the brackets 20' via through holes 27.

To allow for the required pivot movement of the rail elements 12,11 relative to the brackets 20' or connected regions 50,50', the diameter of the through holes 27 in the rail elements 12,11 and the width of the elongate through holes 28 in the support profile 15' are larger than the diameter of the sleeves 26*b*. In this particular embodiment, the diameter and width of the through holes 27,28 are 11 mm while the diameter of the sleeve is 9.5 mm, allowing a pivot movement of about 2 degrees around the first and second vertical axis V1,V2.

Further, due to the straight or flat edge of the second ends 24,25 of the rail elements 12,11, the pivot movement requires that the second ends 24,25 of the rail elements are arranged at a small distance to the rails 110,110' being connected forming a gap 33. In this particular embodiment, the gap 33 between the second ends 24,25 and the corresponding rail 110,110' is about 5 mm.

Figure 22:
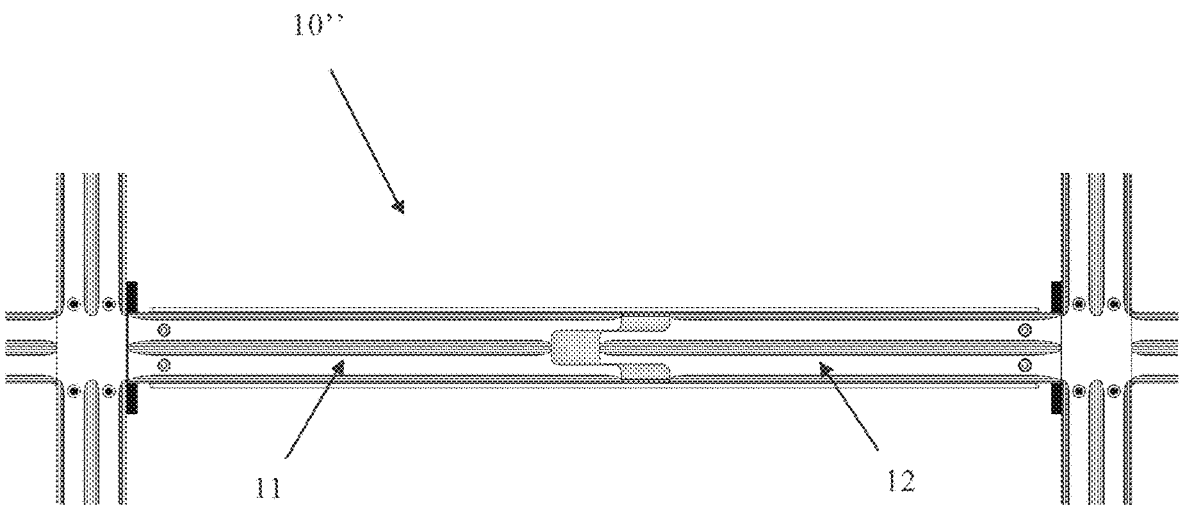
Figure 23:
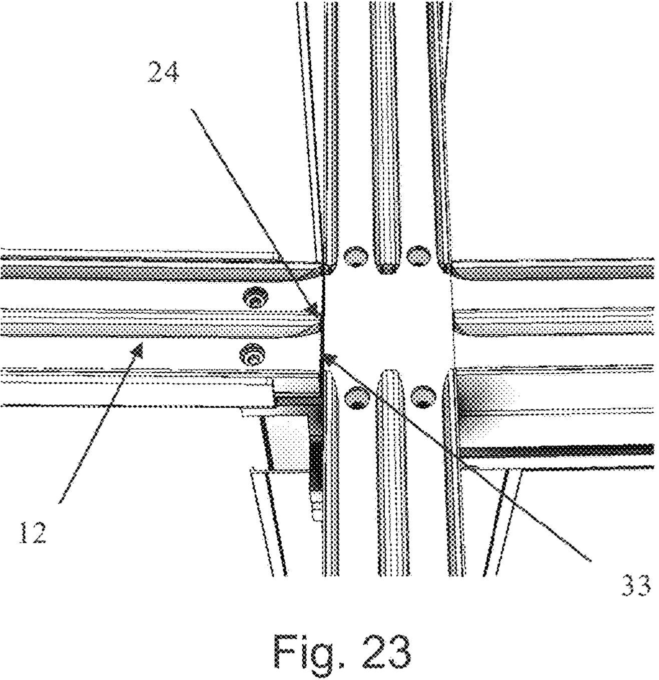

A third exemplary expansion joint 10" is illustrated in FIGS. 22 and 23. The expansion joint 10" has most features in common with the expansion joint in FIGS. 15-21 and differs only in that it is suitable for a slightly different rail system configuration. In the third exemplary expansion joint 10", the second ends 24,25 of the rail elements 12,11 do not cross the periphery of the rail systems 108,108' to which the expansion joint 10" is connected.

LIST OF REFERENCE NUMBERS

1 Prior art automated storage and retrieval system
10,10',10" Expansion joint
11 Second rail element
12 first rail element
14 Junction area
15 Support profile
16' First end (of the support profile)
16" Second end (of the support profile)
17 Vertical surfaces (of the support profile)
18 Fastener, bolt
19 Fastener, pin
20 Bracket
21 Upper horizontal surface (of the support profile)
22 First end (of first rail element)
23 First end (of second rail element)
24 Second end (of first rail element)
25 Second end (of second rail element)
26 Male portion
27',27" Tracks
28 Female portion
29 Fastener (for connecting a bracket to a region of the rail system)
30 Vertically extending connecting element (of a bracket)
31 Horizontally extending connecting element (of a bracket)
32 Profiled upper surface (of a bracket)
33 Gap
34 Recess
100 Framework structure
102 Upright members of framework structure
104 Storage grid
105 Storage column
106 Storage container
106' Particular position of storage container
107 Stack
108 Rail system
110 Parallel rails in first direction (X)
110*a* First rail in first direction (X)
110*b* Second rail in first direction (X)
111 Parallel rail in second direction (Y)
111*a* First rail of second direction (Y)
111*b* Second rail of second direction (Y)
112 Access opening
119 First port column
120 Second port column
201 Prior art container handling vehicle
201*a* Vehicle body of the container handling vehicle 201
201*b* Drive means/wheel arrangement, first direction (X)
201*c* Drive means/wheel arrangement, second direction (Y)
301 Prior art cantilever container handling vehicle
301*a* Vehicle body of the container handling vehicle 301
301*b* Drive means in first direction (X)
301*c* Drive means in second direction (Y)
401 Prior art container handling vehicle
401*a* Vehicle body of the container handling vehicle 401
401*b* Drive means in first direction (X)
401*c* Drive means in second direction (Y)
Y Second direction
Z Third direction

The invention claimed is:

1. A storage system comprising a first region and a second region of a rail system, wherein each of the first region and the second region has rails with a profiled upper surface that define one or more tracks for supporting container handling vehicles, and each rail of at least one pair of parallel rails of the first region is connected to a corresponding rail of a pair of rails of the second region via an expansion joint, the expansion joint comprises:

a first rail element and a second rail element, the rail elements being elongate and configured at a first end to allow the first ends of the first and second rail elements to move relative to one another in a longitudinal direction in a junction area where they overlap, and a profiled upper surface that defines one or more tracks, the tracks extending from the first rail element through the junction area to the second rail element, and wherein a second end of the first rail element is pivotably connected to the first region of the rail system around a first vertical axis, and a second end of the second rail element is pivotably connected to the second region of the rail system around a second vertical axis.

2. A storage system according to claim 1, wherein each of the first rail element and the second rail element is pivotably connected to the first region and the second region, respectively, by a bracket.

3. A storage system according to claim 1, wherein the movement of the first rail element in the longitudinal direction relative to the second rail element is guided by a support profile.

4. A storage system according to claim 3, wherein the support profile comprises a first end configured to be pivotable around the first vertical axis and a second end configured to be pivotable around the second vertical axis.

5. A storage system according to claim 4, wherein at least one of the first end and the second end of the support profile is slidably connected to the first region or the second region, respectively.

6. A storage system according to claim 3, wherein the support profile comprises vertical surfaces extending in the longitudinal direction, the vertical surfaces arranged to prevent lateral movement of the first rail element relative to the second rail element.

7. A storage system according to claim 3, wherein the support profile comprises an upper horizontal surface arranged to support the first rail element and the second rail element from below.

8. A storage system according to claim 3, wherein the support profile has a U-shaped cross-section.

9. A storage system according to claim 3, wherein each of the first rail element and the second rail element is pivotably connected to the first region and the second region, respectively, by a bracket.

10. A storage system according to claim 9, wherein the first rail element and the second rail element is pivotably connected to the corresponding bracket by a fastener.

11. A storage system according to claim 4, wherein at least one of the first end and the second end of the support profile is slidably connected to one of the brackets.

12. A storage system according to claim 9, wherein the support profile is supported by at least one of the brackets.

13. A storage system according to claim 1, wherein each of the first region and the second region has rails extending in two perpendicular directions forming a rail grid upon which the container handling vehicle may move in two perpendicular directions.

14. An expansion joint for connecting a first region and a second region of a rail system, the expansion joint comprising a first rail element, a second rail element and two brackets, wherein each of the first and second rail element is elongate and comprises a first end, a second end and a section of a profiled upper surface defining one or more tracks, the first ends of the first and second rail elements are configured to move relative to one another in a longitudinal direction in a junction area where they overlap, the sections of profiled upper surface extend from the first rail element through the junction area to the second rail element, and the second end of the first rail element is pivotably connected to one of the brackets around a first vertical axis and the second end of the second rail element is pivotably connected to the other bracket around a second vertical axis, each bracket being connectable to the first region or the second region.

15. An expansion joint according to claim 14, comprising a support profile having a first end configured to be pivotable around the first vertical axis and a second end configured to be pivotable around the second vertical axis, at least one of the first end and the second end is slidably connected to one of the brackets.

16. A method of allowing rail expansion/contraction between a first region and a second region of a rail system, wherein each of the first region and the second region has rails with a profiled upper surface that define one or more tracks for supporting container handling vehicles, the method comprising:

connecting each rail of at least one pair of parallel rails of the first region to a corresponding rail of a pair of rails of the second region via an expansion joint, wherein the expansion joint comprises a first rail element and a second rail element, the rail elements being elongate and configured at a first end to allow the first ends of the first and second rail elements to move relative to one another in a longitudinal direction in a junction area where they overlap, and a profiled upper surface that defines one or more tracks, the tracks extending from the first rail element through the junction area to the second rail element, and wherein a second end of the first rail element is pivotably connected to the first region of the rail system around a first vertical axis, and a second end of the second rail element is pivotably connected to the second region of the rail system around a second vertical axis.

* * * * *